UNITED STATES PATENT OFFICE.

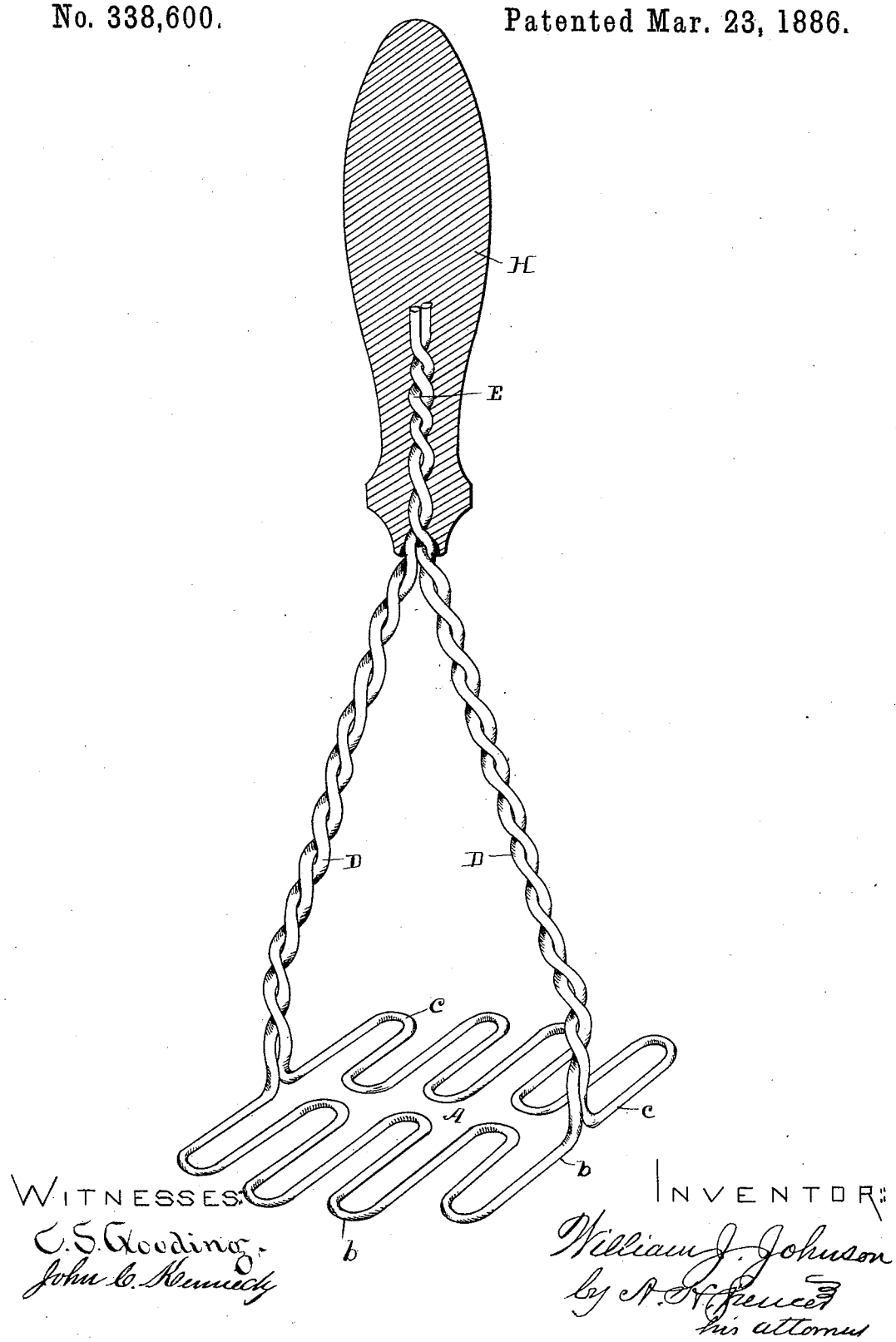

WILLIAM J. JOHNSON, OF NEWTON, ASSIGNOR TO THE NATIONAL MANUFACTURING COMPANY, OF BOSTON, MASSACHUSETTS.

VEGETABLE-MASHER.

SPECIFICATION forming part of Letters Patent No. 338,600, dated March 23, 1886.

Application filed January 16, 1886. Serial No. 188,793. (No model.)

*To all whom it may concern:*

Be it known that I, WILLIAM J. JOHNSON, of Newton, in the county of Middlesex and State of Massachusetts, have invented a new and useful Improvement in Vegetable-Mashers, of which the following, taken in connection with the accompanying drawings, is a specification.

The object of this invention is to provide a wire vegetable-masher, strong, simple, and cheap, yet in its working face or body free from joints and from overlapping surfaces forming crevices in which particles of food may lodge.
My improvement also includes a better and cheaper shank for double-wire implements.

My invention is embodied in a masher made of two wires, each sinuously bent to form one-half of the body of the implement, with the prolongations of said wires joined laterally into arms which extend upwardly together from the sides of the body, and unite in a shank or common stem furnished with a suitable handle. The stem is, by preference, a continuation of two of the wire ends only from the point where the two arms meet.

The drawing is a perspective view of the best form in which I have embodied my invention, showing its several features, with the handle represented in section.

The working face or body A of my utensil is made up of the two sinuously-bent wires *b c*, extending back and forth in the same plane, either horizontally or slightly curved. The short bends of these wires give a greatly-increased stiffness to the head, as compared with one in which the sinuosities run entirely across it. There is also an advantage in leaving a space centrally between the two sinuous wires where the material being mashed may penetrate, thereby increasing the mashing-surface, and a more symmetrical form is produced by uniting the two wires. The arms D are formed by uniting laterally the two wires *b c* at each side of the head, and preferably by twisting them together all the way up to the stem E. The tinning, which gives a suitable surface-coating to the wires, at the same time unites them permanently. These twisted arms are of much more than double the stiffness of either wire singly. The four ends of the wires may be twisted together to form the stem E; but I prefer to terminate two of them at or near the point of junction of the arms D, and continue the other two, suitably united, up to the end of the stem. They may there be formed into a ring or handle; but I usually provide a simple wooden handle, H, into which the wires are inserted endwise. This part of my invention is applicable to other wire utensils of this general character.

A saving in wire, in labor, and in weight of the implement is effected by making the shank E of two of the wire ends only, as shown, and the shank is then as strong as either of the arms D. By discontinuing two of the ends before forming the shank, its diameter is reduced, and a much smaller perforation in the handle is required, leaving the handle itself much less likely to be split in applying it or in use. I am accustomed to countersink or bevel the outer end of the axial perforation of the handle, to enable it at that point to receive and fit over the converging ends of the arms D, thus strengthening the utensil.

I am aware of the patents to Brown, dated June 6, 1876, and to Huffer, dated August 8, 1876, showing mashers having a body formed of a single sinuously-bent wire, the ends of which are bent separately inward and joined together by twisting to form a central shank, inserted into the handle. I make no claim to such single-wire mashers, a peculiarity of my device being the body formed of two separate wires joined below the shank at the sides of the body, so as to form the double-wire arms D, and then uniting either two or all four of the ends of the wires so joined into one shank.

A masher has heretofore been made having its shank, its arms, and the frame or outline of its body formed of two wires, with several straight pieces of wire forming cross-bars suitably secured at their ends on the frame of the body, the four ends of the two main wires being all united and continuous to the tip of the shank. All such devices I disclaim; but

I claim as my invention—

1. As an improved article of manufacture, the vegetable-masher herein described, having the body A formed of the two sinuous wires *b* and *c*, arranged in the same plane, the converging arms D, formed of said wires bent upwardly, joined in lateral contact at each side of the body, and extending side by side upwardly therefrom, and the stem E, formed by the union of said wires, with a suitable handle, substantially as set forth.

2. The masher described, having a body made of two separate wires running sinuously in the same plane, two arms formed by twisting together the upward prolongations of said wires and causing the twisted strands to converge and meet, and a shank made of the united ends of such wires, two of the ends extending beyond the other two, substantially as set forth.

3. The wire frame or body A, and the converging arms D, each formed of two wires united laterally, in combination with the shank E, formed by the union of two only of the wires composing said arms, and with a suitable handle, H, substantially as set forth.

In testimony whereof I have signed my name to this specification, in the presence of two subscribing witnesses, on this 6th day of January, A. D. 1886.

WILLIAM J. JOHNSON.

Witnesses:
N. H. SPENCER,
J. C. KENNEDY.